(12) United States Patent
Healy

(10) Patent No.: US 6,528,443 B1
(45) Date of Patent: Mar. 4, 2003

(54) WATER SOLUBLE GLASS COMPOSITION

(75) Inventor: David Michael Healy, Ayr (GB)

(73) Assignee: Giltech Limited, Ayr (GB)

( * ) Notice: Subject to any disclaimer, the term of this patent is extended or adjusted under 35 U.S.C. 154(b) by 0 days.

(21) Appl. No.: 09/701,600

(22) PCT Filed: May 27, 1999

(86) PCT No.: PCT/GB99/01676
§ 371 (c)(1),
(2), (4) Date: Jan. 18, 2001

(87) PCT Pub. No.: WO99/62834
PCT Pub. Date: Dec. 9, 1999

(30) Foreign Application Priority Data

Jun. 1, 1998 (GB) .............................. 9811663

(51) Int. Cl.$^7$ ............................ C03C 3/19; C03C 13/06
(52) U.S. Cl. .......................... 501/47; 501/36; 501/45
(58) Field of Search ................... 501/35, 36, 45, 501/47, 53, 55, 63, 65, 72, 73, 77, 78, 64

(56) References Cited

U.S. PATENT DOCUMENTS

| | | | |
|---|---|---|---|
| 3,284,368 A | 11/1966 | Hatch | 252/389 |
| 3,338,670 A | 8/1967 | Fuchs | 23/106 |
| 3,589,858 A | 6/1971 | Ralston | 21/2.7 |
| 4,407,786 A | 10/1983 | Drake et al. | 424/14 |
| 4,612,923 A | 9/1986 | Kronenthal | 128/92 R |
| 4,678,659 A | 7/1987 | Drake et al. | 424/451 |
| 5,049,139 A * | 9/1991 | Gilchrist | 604/265 |
| 5,252,523 A | 10/1993 | Beall et al. | 501/43 |
| 5,573,055 A * | 11/1996 | Melling et al. | 164/15 |

FOREIGN PATENT DOCUMENTS

| | | |
|---|---|---|
| DE | 950 089 | 10/1956 |
| EP | 0 365 237 A2 | 4/1990 |
| EP | 0 494 358 A1 | 7/1992 |
| WO | 85/01210 | 3/1985 |

\* cited by examiner

Primary Examiner—David Sample
Assistant Examiner—Elizabeth A Bolden
(74) Attorney, Agent, or Firm—Drinker Biddle & Reath LLP

(57) ABSTRACT

A composition for a water soluble glass is described. The composition is unusual in that it contains no or very small quantities (up to 5 mole %) of alkali earth metal compounds. The composition typically comprises $P_2O_5$: 40 to 60 mole %; $B_2O_3$: 0 to 10 mole %; $Na_2O$: 30 to 40 mole %; $K_2O$: 5 to 10 mole %; $Ag_2O$: 0 to 5 mole %; and up to a total of 5 mole % of other compounds such as CaO, MgO etc. The composition is especially suitable for processing into water soluble glass fibers or wool since the melting point is very low, usually less than 350° C.

11 Claims, No Drawings

WATER SOLUBLE GLASS COMPOSITION

This application is the U.S. national phase application of PCT International Application No. PCT/GB99/01676 filed May 27, 1999.

The present invention relates to a composition for a water-soluble glass, especially for a glass adapted for fibre production.

It is known that certain glasses in which the usual glass former, silicon dioxide, is replaced with phosphorous pentoxide are soluble in water and body fluids. The rate of dissolution is controlled largely by the addition of glass modifiers such as calcium oxide. In simple terms, the greater the concentration of the modifier the slower the rate of dissolution. The rate of dissolution may range from minutes through to several years.

Soluble phosphate based glasses which have demonstrated good biocompatability can incorporate inorganic metals such that a sustained release of the metals can be provided at the wound site. Such materials can also find use in mechanical applications where, for example, slow release of an anti-corrosion agent may be beneficial.

Certain applications require that the glass is in the form of wool or fibres for mechanical applications such as insulation wool and packaging. Thus, for example, Mohr et al in "Fibre Glass" (Van Norstrand, Reinhold Company, New York 1978) and Jaray in "A New Method of Spinning Glass Fibres" (28th Annual SPI RP/C Institute proceedings 1973, Section 3-A) describe the production of wool and fibres, respectively, from molten glass. The glass fibres can be used for insulation, construction or even communication purposes. Glass wool also finds uses in packaging and insulation applications.

Normally, glass fibres are produced from molten glass using traditional fibre pulling techniques; whereby filaments of high temperature molten glass (850°–1300° C.) are formed into strands and stretched over pull rolls before being collected onto a reel.

Glass wool formation is similar in that the glass is initially melted in a crucible. The crucible has suitable apertures to allow filaments of glass to flow downwards, which are then "blown" into wool using jets of either steam or compressed air. Alternatively, glass wool can be formed using a flame attenuation process, developed by Owens-Corning Fibreglass Corporation circa 1940. In this process molten glass passes through a bushing stage where primary filaments approximately 1 mm wide are formed. The fibres are then aligned into an exact uniformly juxtaposed array, using a fibre guide, into a jet flame issuing from an internal combustion burner. The jet flame causes thinning and lengthening of the fibres before they are collected on a steel mesh belt.

In both cases, the glass is either supplied in molten form direct from a crucible or from a temperature-gradient furnace.

Generally, water soluble glasses do not lend themselves to these traditional fibre and wool forming techniques. As an example, U.S. Pat. No. 4,604,097 of Graves et al. discloses a water soluble drawn fibre, composed primarily of calcium oxide and phosphorous pentoxide. The fibre produced has a very low tensile strength, compared to fibres spun from non-soluble glass compositions.

Further, water soluble glasses can also be chemically aggressive when molten, unlike traditional glasses where silicon dioxide is used as the glass former. Additionally, the fibres produced are prone to thermal shock and can suffer from devitrification or crystallisation.

To combat problems of devitrification and crystallisation, water soluble glass fibres have been previously produced in exacting conditions. Thus, for example, Zimmer et al. in WO-A-92/07801 discloses drawing fibres from a water soluble glass composed primarily of phosphorus pentoxide, calcium oxide and iron oxide. In order to keep the viscosity of the glass suitable for drawing, the fibres were drawn at 1200° C. Also as a result of the chemically aggressive nature of the glass at that temperature the glass was pulled in an oxygen rich atmosphere (as high as 80% oxygen by volume). Obviously the commercial production of glass fibres under these high temperature controlled atmospheric conditions is expensive.

The problems of working with water soluble glass are compounded by the very nature of the glass. Metal oxides of elements such as lead and tellurium have previously been used in glass as additives to affect qualities of the glass; crystallisation temperature, viscosity and density, for example. As a result of environmental concerns and particularly when the glasses are to be used in a biological application these additives must be avoided and replaced by more acceptable alternatives.

Our copending Application, WO-A-98/54104, describes a method of producing water soluble glass fibres. We have now found a particular type of composition which is especially suited to this method. In the prior art compositions described therein a mixture of Group I and Group II compounds are present, and a typical phosphorus pentoxide based glass composition comprises approximately 30 mole % $Na_2O$ and approximately 15 mole % CaO.

The composition of the present invention comprises a glass former (which is typically phosphorus pentoxide) and an alkali metal compound. Preferably no alkaline earth metal (Group II) elements or compounds containing such elements are present, although very low quantities (eg 1–2 mole %, and not more than 5 mole %) may be useful to adjust the rate of dissolution of the glass. This low level or absence of alkaline earth metal compounds forms a distinction over the water soluble glass compositions currently available. The reference to alkali metal compounds herein refers to compounds of Group Ia (Li, Na, K, Rb, Cs and Fr) and the reference to alkaline earth metal compounds herein refers to compounds of Group IIa (Be, Mg, Ca, Sr, Ba, Ra).

The present invention thus provides a water soluble glass composition formed from a glass former and at least one alkali metal compound, characterised in that said glass composition contains a maximum amount of alkaline earth metal compounds of 5 mole %.

Phosphorous pentoxide ($P_2O_5$) is preferably used as a glass former and desirably the glass former will preferably be mainly $P_2O_5$. Solution rate control and stability can be affected by the addition of other glass formers such as boron, silica, alumina, sulphur, germanium, arsenic etc. Generally the mole percentage of phosphorous pentoxide in the glass composition is less than 85 mole %, preferably less than 60 mole % and especially between 30–60 mole %.

Alkali metals and lanthanide oxides or carbonates are preferably used as glass modifiers. Generally, the mole percentage of alkali metals and lanthanide oxides or carbonates is less than 60 mole %, preferably between 40–60 mole %.

Boron containing compounds (eg $B_2O_3$) are preferably used as glass additives. Generally, the mole percentage of boron containing compounds is 15 mole % or less, preferably 10 mole % or less, especially 5 mole % or less.

As indicated above, other compounds may also be added to the glass to modify its properties, for example $SiO_2$, $Al_2O_3$, $SO_3$, MgO, CaO, ZnO, sulphate ions ($SO_4^{2-}$) or transition metal compounds (eg. first row transition metal compounds), but these will be present only in very low quantities, for example up to a total amount of 5 mole % or less of the glass composition.

Typically the soluble glasses used in this invention comprise phosphorus pentoxide ($P_2O_5$) as the principal glass-former, together with any one or more glass-modifying non-toxic materials such as sodium oxide ($Na_2O$) and potassium oxide ($K_2O$). The rate at which the glass dissolves in fluids is determined by the glass composition, generally by the ratio of glass-modifier to glass-former and by the relative proportions of the glass-modifiers in the glass. By suitable adjustment of the glass composition, the dissolution rates in water at 38° C. ranging from substantially zero to 25 mg/cm²/hour or more can be designed. However, the most desirable dissolution rate R of the glass is between 0.01 and 2.0 mg/cm²/hour.

The water-soluble glass is thus preferably a phosphate glass, and preferably comprises a source of silver ions which may advantageously be introduced during manufacture as silver orthophosphate ($Ag_3PO_4$). The glass preferably enables controlled release of silver and other constituents in the glass and the content of these additives can vary in accordance with conditions of use and desired rates of release, the content of silver generally being up to 5 mole %. While we are following convention in describing the composition of the glass in terms of the mole % of oxides, of halides and of sulphate ions, this is not intended to imply that such chemical species are present in the glass nor that they are used for the batch for the preparation of the glass.

The optimum rate of release of silver ions into an aqueous environment may be selected by circumstances and particularly by the specific function of the released silver. The invention provides a means of delivering silver ions to an aqueous medium at a rate which will maintain a concentration of silver ions in said aqueous medium of not less than 0.01 parts per million and not greater than 10 parts per million. In some cases, the required rate of release may be such that all of the silver added to the system is released in a short period of hours or days and in other applications it may be that the total silver be released slowly at a substantially uniform rate over a period extending to months or even years. In particular cases there may be additional requirements, for example it may be desirable that no residue remains after the source of the silver ions is exhausted or, in other cases, where the silver is made available it will be desirable that any materials, other than the silver itself, which are simultaneously released should be physiologically harmless. In yet other cases, it may be necessary to ensure that the pH of the resulting solution does not fall outside defined limits.

An exemplary composition contains:
$P_2O_5$: 30 to 60 mole %;
$Na_2O$: 30 to 60 mole %; and
$K_2O$: 5 to 15 mole %;
and optionally may contain:
$B_2O_3$: 0 to 15 mole %; and/or
$Ag_2O_3$: 0 to 5 mole %; and/or
NaF: 0 to 5 mole %; and/or
total alkaline earth metal compounds: 0 to 5 mole %.
A preferred composition contains:
$P_2O_5$: 40 to 60 mole %;
$B_2O_3$: 0 to 10 mole %;
$Na_2O$: 30 to 40 mole %;
$K_2O$: 5 to 10 mole %;
$Ag_2O$: 0 to 5 mole %; and
up to 5 mole % of other additive compounds such as CaO, MgO, ZnO, etc.

These glasses are characterised by having a very low melting point (for example less than 350° C., usually less than 300° C.)

According to a further aspect of the present invention the composition described above is processed into glass fibres and/or wool.

In the method described in our copending Application WO-A-98/54104 a composition for water-soluble glass is heated above its melting point and then cooled to a working temperature at which fibre formation occurs.

Generally, the glass is initially heated to a high temperature (800° C. to 1200° C.) to clarify the glass and then taken to a melting temperature of 500°–800° C. The temperature is then slowly lowered to the working temperature at which fibre formation occurs.

Generally, the working temperature of the glass will be at least 200° C. lower than the temperature at which the glass is initially heated. Suitable working temperatures may fall within the following ranges 400°–600° C. (preferably 400°–500° C., more preferably approximately 450° C.). The working temperature selected will depend upon the glass composition, but an approximate indication of a suitable working temperature can be established as hereinafter described. Depending upon the glass composition used, the working temperature may be a range of suitable temperatures. The range of working temperatures may be narrow, for example of only 10° C., so that fibre formation may occur only between the temperature of N° C. to (N+10)° C. Other glass compositions may have a wider temperature range for the working temperature in which glass formation is possible.

Alternatively, the working temperature of the glass may be defined as 50–100° C. above the Tg of the glass.

In order to obtain an approximate indication of the working temperature for any particular glass composition, the glass composition should be slowly heated to its melting point. As soon as the glass is molten, frequent attempts to pull the composition upwardly to form a fibre should be made, with the temperature of the composition being very gradually increased between attempts. The temperature range of the composition during which fibre formation is possible should be noted and used as a preliminary working temperature in the process of the invention.

It will be clear to those skilled in the art that the pulling speed at which the fibre is drawn off can affect the choice of working temperature and the diameter of the fibre required. Where a fibre of relatively large diameter is required, the fibre tends to be pulled more slowly and the working temperature may need to be decreased slightly. Where a fibre of relatively small diameter is required (eg a glass wool), the fibres may be drawn at the much higher pulling speed and the working temperature may need to be increased (thus lowering the viscosity of the composition to accommodate the increased pulling speed). Selection of the exact working temperature in respect of any particular fibre size and composition will be a simple matter of routine evaluation of optimal process conditions.

With reference to the "working temperature", of the glass, the skilled person will appreciate that the furnace temperature may differ considerably from the temperature of the glass itself and indeed there may be a significant temperature gradient in the glass. Ideally the "working temperature" will be the temperature of the glass as fibre formation (ie.

pulling) takes place. In many compositions however, it may not be practical to measure the temperature at the surface of the glass where pulling occurs by insertion of a temperature probe as the introduction of the probe may precipitate crystallisation of the glass. One alternative is to place a temperature probe into the bushing and to monitor the bushing temperature which will be a good indicator of the glass temperature at the moment of fibre formation. Alternatively an Infra Red pyrometer may be focused onto the appropriate area of the glass and used to monitor the temperature.

The glass to be formed into fibres will generally be heated until molten, optionally clarified, and then cooled slowly and controllably until the appropriate working temperature is reached and fibre formation can commence. The initial heating of the glass above its melting point and the subsequent fibre formation may be carried out in a single vessel or, alternatively, the molten glass may be transferred to a vessel designed specifically for fibre formation. One way of holding the molten glass in a vessel having a bushing within its lower surface until the temperature drops to the required working temperature is to coat or fill the holes of the bushing with a material that gradually melts over the period of time taken for the glass to reach the temperature required.

The most important aspect of the present invention is the manner in which the working temperature is reached. We have found that the molten glass, which may preferably be heated significantly above its melting point, should be allowed to cool in a highly controlled manner, the temperature being only gradually reduced until the working temperature is reached. A stirrer may be present to ensure that the temperature of the whole of the molten glass is kept as uniform as possible.

The glass is cooled to a temperature at which the glass will not crystallise for at least the period of time needed to convert the melt to fibre. This temperature is termed a "holding temperature". The rate of cooling from this holding temperature is determined by the rate at which the melt is consumed at the bushing and the difference in temperature between the bushing temperature (the working temperature) and the melt holding temperature.

Due to low viscosity and narrow temperature band for many of these compositions, control of the balance between melt temperature, bushing temperature and glass throughput rate is critical.

The glass composition produces good stable strong consistent fibres.

The present invention will now be further described by reference to the following, non-limiting, examples:

EXAMPLE 1

| | |
|---|---|
| $Na_2O$ | 31.19 mole % |
| $K_2O$ | 9.63 mole % |
| $Ag_2O$ | 2.9 mole % |
| $B_2O_3$ | 2.74 mole % |
| 2NaF | 0.66 mole % |
| $P_2O_5$ | 52.88 mole % |

Furnace at 710° C.–800° C.
Bushing at 450° C.–460° C.
4.5 mm bushing holes.
50 km per hour pull rate.
Good fibres.
Solution rate=1.68 not annealed 2.28 annealed ($mg.cm^{-3}.hr^{-1}$)

EXAMPLE 2

| | |
|---|---|
| $Na_2O$ | 32 mole % |
| $K_2O$ | 10 mole % |
| $Ag_2O$ | 3 mole % |
| $P_2O_5$ | 55 mole % |

Furnace at 850° C.
Bushing at 530° C.
5 mm bushing holes.
55 kmph.
Good strong fibres.

EXAMPLE 3

| | |
|---|---|
| $Na_2O$ | 32 mole % |
| $K_2O$ | 10 mole % |
| (MgO | 4 mole % - added as an anti-microbial) |
| $B_2O_3$ | 5 mole % |
| $Ag_2O$ | 3 mole % |
| $P_2O_5$ | 46 mole % |

Furnace temperature 650° C.–730° C.
Bushing temperature 410° C.–420° C.
Bushing 5.5 mm diameter.
Speed up to 100 kmph.
Solution rate 0.7 annealed 1.0 non annealed ($mg.cm^{-3}.hr^{-1}$).
Very good strong reliable fibre. Very stable.
Example 3 can be modified by replacing the MgO with ZnO.

EXAMPLE 4

| | |
|---|---|
| $Na_2O$ | 36.68 mole % |
| $K_2O$ | 8.63 mole % |
| $P_2O_5$ | 45.09 mole % |
| $B_2O_3$ | 5.29 mole % |
| $Ag_2O$ | 2.59 mole % |
| (CaO | 1.73 mole % to attenuate solution rate) |

Furnace temperature 550° C.
Bushing 62×5.0 mm holes.
Bushing temperature 400° C.
Speed 80 kmph.
Very good fibres.
Solution rate 3.11 annealed, 3.8 non annealed ($mg.cm^{-2}.hr^{-1}$)
The fibres show excellent tensile strength, flexibility and shock resistance.

The fibres are especially suitable for industrial and plastics reinforcement controlled release (anti-microbial, anti-corrosion etc) and rapidly biodegradable applications.

What is claimed is:
1. A water-soluble glass fibre consisting essentially of the following constituents:
$P_2O_5$: 30 to 60 mole %;
$Na_2O$: 30 to 60 mole %;
$K_2O$: 5 to 15 mole %;
$B_2O_3$: greater than 0 to 15 mole %;

Ag$_2$O: 0 to 5 mole %;
NaF: 0 to 5 mole % and
alkaline earth metal compounds: 0 to 5 mole %.

2. The water soluble glass fibre as claimed in claim 1 wherein a maximum of 2 mole % of alkaline earth metal compounds are present.

3. The water soluble glass fibre as claimed in claim 1 wherein the ranges of the following compounds are:

P$_2$O$_5$: 40 to 60 mole %;
B$_2$O$_3$: greater than 0 to 10 mole %;
Na$_2$O: 30 to 40 mole %;
K$_2$O : 5 to 10 mole %; and
Ag2O: 0 to 5 mole %;
wherein the compounds constitute at least 95 mole % of the water soluble glass fibre.

4. The water soluble glass fibre as claimed in claim 1 wherein 4 mole % or less of the alkaline earth metal compound(s) are present, and the only alkaline earth metal compound(s) are selected from the group consisting of MgO and CaO.

5. The water soluble glass fibre as claimed in claim 4 wherein 2 mole % or less of the alkaline earth metal compound(s) are present.

6. The water soluble glass fibre as claimed in claim 1, which contains no alkaline earth metal compounds.

7. The water soluble glass fibres as claimed in claim 1 wherein up to 5 mole % of silver is present.

8. The water soluble glass fibre as claimed in claim 1 which has a melting point of 350° C. or less.

9. The water soluble glass fibre as claimed in claim 8 which has a melting point of 300° C. or less.

10. A glass wool comprising the water soluble glass fibre as claimed in claim 1.

11. A water-soluble glass fibre consisting essentially of the following constituents:

P$_2$O$_5$: 30 to 60 mole %;
Na$_2$O: 30 to 60 mole %;
K$_2$O: 5 to 15 mole %;
B$_2$O$_3$: 5 to 15 mole %;
Ag$_2$O: 0 to 5 mole %;
NaF: 0 to 5 mole % and
alkaline earth metal compounds: 0 to 5 mole %.

* * * * *